United States Patent
Jones

(10) Patent No.: US 7,240,886 B2
(45) Date of Patent: Jul. 10, 2007

(54) ADJUSTABLE WOODWORKING STAND

(76) Inventor: Sam Jones, 29101 SE. 371st St., Enumclaw, WA (US) 98022

( * ) Notice: Subject to any disclaimer, the term of this patent is extended or adjusted under 35 U.S.C. 154(b) by 0 days.

(21) Appl. No.: 10/825,723

(22) Filed: Apr. 16, 2004

(65) Prior Publication Data
US 2005/0012000 A1   Jan. 20, 2005

Related U.S. Application Data

(60) Provisional application No. 60/466,809, filed on Jul. 16, 2003.

(51) Int. Cl.
*F16M 11/00* (2006.01)

(52) U.S. Cl. .................. 248/405; 248/161; 248/177.1; 248/178.1

(58) Field of Classification Search ............ 248/178.1, 248/163.1, 177.1, 176.3, 158, 161, 405, 406.1, 248/354.3, 354.5
See application file for complete search history.

(56) References Cited

U.S. PATENT DOCUMENTS

| | | | |
|---|---|---|---|
| 839,541 A * | 12/1906 | Berger .................... 248/178.1 |
| 2,336,104 A * | 12/1943 | Grover et al. ........... 248/183.1 |
| 2,422,795 A * | 6/1947 | McKnight .................... 254/98 |
| 2,504,291 A * | 4/1950 | Alderfer ....................... 254/98 |
| 2,845,244 A * | 7/1958 | Prokop ....................... 248/171 |
| 3,064,932 A * | 11/1962 | Holderman ................ 248/171 |
| 5,297,779 A * | 3/1994 | Collins et al. ................ 254/98 |
| 5,435,509 A * | 7/1995 | Bingham .................... 248/159 |
| 5,979,854 A * | 11/1999 | Lundgren et al. ......... 248/354.3 |
| 5,984,353 A * | 11/1999 | Rasmussen ............. 280/766.1 |
| 6,305,117 B1 * | 10/2001 | Hales, Sr. ...................... 42/94 |
| 6,505,803 B1 * | 1/2003 | Hernandez ............... 248/354.5 |
| 6,609,686 B2 * | 8/2003 | Malizia ................... 248/125.8 |

* cited by examiner

*Primary Examiner*—Amy J. Sterling
(74) *Attorney, Agent, or Firm*—Black Lowe & Graham PLLC

(57) ABSTRACT

An adjustable stand includes a leg, a first member secured to the leg, a second member adjustably secured to said first member, and a support member for holding items on the stand, the support member is secured to the second member. A first adjustment mechanism is coupled between the first member and the second member. Movement of the first adjustment mechanism shifts the position of said second member relative to said first member thereby raising or lowering said support member. A retention member is secured between the first member and the second member, the retention member securing the first member to the second member, while allowing at least limited relative movement relative to the first member. A first adjustment mechanism includes a nut threaded on a shaft, bearing against the first tubular member and an anti-rotation lock secured to the shaft and coupled to the first tubular member.

12 Claims, 3 Drawing Sheets

ADJUSTABLE WOODWORKING STAND

PRIORITY INFORMATION

This invention claims the benefit of provisional application 60/466,809 filed on Jul. 16, 2003 and incorporated herein by reference.

BACKGROUND OF THE INVENTION

Woodworking stands are stands that support heavy materials in the course of sawing, milling, or other operations that require the moving of the heavy materials relative to a tool. Generally, stands have been of two types: heavy, immobile, and expansive stands and flimsy, portable, and unstable stands. To date, the principal determining factor in the price and quality of a stand has being the mechanism for adjusting a height of the stand to correspond with the level of a tool.

As a rule, the adjusting mechanism for the most expensive stands comprises of the plurality of threaded shafts and stabilizing rods to ensure the head of the stand remains in constant orientation to its space. Rotating the threaded shafts simultaneously ensures that the stand remains orthogonal to the supporting stand and parallel to the plane of the tool. In many instances, the threaded shafts are in geared relationship one to the other to assure their simultaneous and precise rotation in response to the rotation of an additional handle. All of the mechanism necessary for the adjustment in height adds weight to the stand. Ultimately this weight limits the utility of the stand outside of a permanent woodworking shop. Such stands could not readily be brought to the job site.

The inexpensive stands generally use some form of wedges or threaded screws to fix the height of a sliding shaft. By holding the shaft at desired height and then tightening the wedge or threaded screw assembly the stand assumes a desired height. Such adjusting mechanisms are coarse in adjustment though mechanically simple. Generally, the shaft is allowed to slide feely in the stand in order to allow this coarse adjustment of height. Unfortunately, the same freedom of movement allowed the shaft to fall apart when transported to or from a job site.

The coarse adjustment possible with the inexpensive stands is generally unsatisfactory to a woodworker seeking a precise fit and finish in his woodworking products. The adjusting mechanisms tend to be sloppy and difficult to precisely adjust. Only with the greatest attention is one able to perfectly align the top of the stand with the table of the tool in question. Because of the coarseness of the adjustment it is also difficult to maintain the stand at the appropriate height.

What is needed in the art then is the adjustable stand that is both relatively inexpensive and capable of fine and precise adjustment.

SUMMARY OF THE INVENTION

The present invention provides an adjustable stand, such as a woodworking stand, for supporting materials or items. The stand preferably includes a leg, a first member secured to the leg, a second member adjustably secured to the first member, a support member for holding items on the stand, a first adjustment mechanism, and a retention member to secure the first and second members. The first and second members have upper ends and lower ends. The upper end of the second member extends above the upper end of the first member. The support member is secured to the upper end of the second member. The first adjustment mechanism is coupled between the first member and the second member. Movement of the first adjustment mechanism shifts the position of the second member relative to the first member, thereby raising or lowering the support member. The retention member is secured between the first member and the second member. The retention member allows at least limited relative movement between the first and second members.

In one preferred embodiment, the retention member comprises a biasing member. The biasing member includes a compression spring.

The first member preferably comprises a first tubular member. A second tubular member is also provided, into which the first tubular member is slideably engaged. The leg is attached to the tubular member. Alternate embodiments employ a single leg or multiple legs.

A coarse adjustment mechanism is ideally coupled between the first and second tubular members. The coarse adjustment mechanism selectively locks the position of the first and second tubular members relative to each other. Thus, additional large movement adjustments are possible with the coarse adjustment member. In one preferred embodiment, the coarse adjustment mechanism includes a screw retainably secured to the second tubular member. This screw has an end selectively bearing against the first tubular member when a locking engagement is desired. A friction pad is also preferably provided between the first and second tubular members opposite the screw between the tubular members.

The second member preferably comprises a shaft partially held within the first tubular member. At least a portion of the shaft is threaded. The first adjustment mechanism includes a nut threaded on the threaded portion of the shaft. The nut bears against the portion of the first tubular member to hold the members in a desired position. Rotation of the nut allows the fine-tuning of the relative position of the shaft and first tubular member for adjusting the support member.

In order to block rotation of the shaft when the nut is turned, an anti-rotation lock is preferably secured to the shaft and coupled to the first tubular member. The first tubular member is non-circular in cross-section and the lock preferably comprises a pin extending transversely through the shaft and non-rotatably engaged with the first tubular member. Thus, the pin may translate longitudinally along the axis of the first tubular member, but will not rotate about such axis.

The leg (or legs in the preferred embodiment) is preferably pivotally secured to the first member. When a second tubular member is provided, the leg(s) are secured to the second tubular member, which is in turn secured to the first tubular member.

The invention also includes a method of operating a work stand. The steps include providing a stand, placing the stand legs on a working surface such as the ground or floor, biasing a shaft of the stand downwardly, and adjusting the position of the shaft. The stand is provided with legs, an upright tubular member held between the legs, and a shaft held within and extending above the tubular member. A support is secured to the top of the shaft. When the lower ends of the legs are placed on the surface, the tubular member is held substantially upright by the legs. The shaft is biased downwardly relative to the tubular member. Adjusting the position of the shaft relative to the tubular member is accomplished with an adjustment mechanism coupled to the shaft and to the tubular member.

The method preferably includes the stand provided with a coarse adjustment mechanism between the legs and the upright tubular member. The coarse adjustment mechanism is used to change the position of the upright tubular member relative to the legs.

The method also includes the step of stopping the rotation of the shaft while adjusting the position of the shaft relative to the tubular member. The step of stopping rotation is carried out with an anti-rotation pin held by the shaft and bearing against the upright tubular member.

BRIEF DESCRIPTION OF THE DRAWINGS

The preferred and alternative embodiments of the present invention are described in detail below with reference to the following drawings.

DETAILED DESCRIPTION OF THE DRAWINGS

Figure 1:
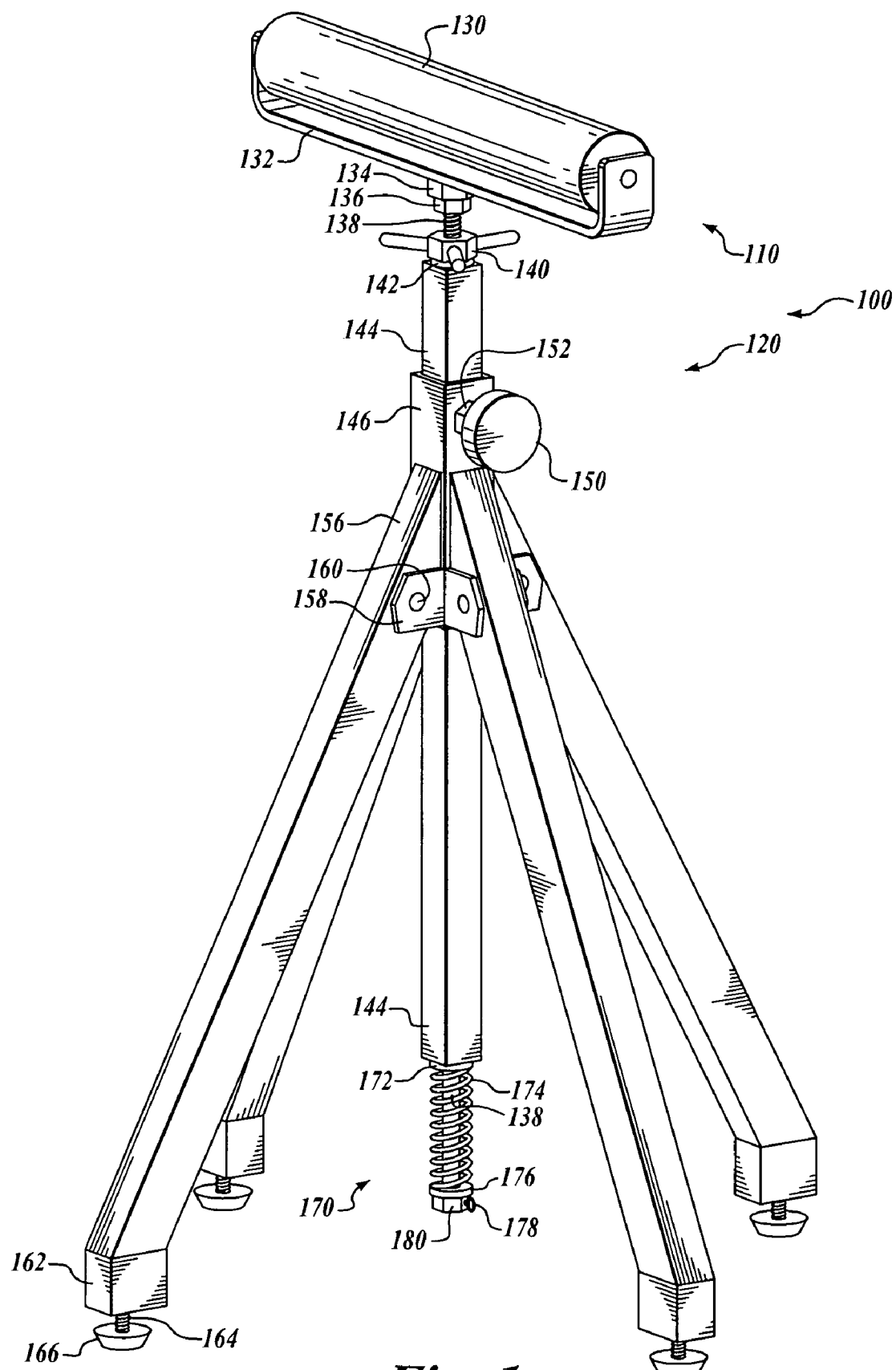
FIG. 1 is a perspective view of a stand assembly.

FIG. 1 shows a perspective view of a stand assembly 100 comprising an outfeed roller assembly 110 and a base assembly 120. The outfeed roller assembly 110 comprises a roller 130 rotatably held by a roller bracket 132. In turn, the roller bracket 132 is affixed to a receiving nut 134 at its midpoint. The receiving nut 134 is configured to receive a threaded shaft 138 to thereby affixed the roller assembly to the stand assembly. A jamming nut 136 rotates along the threads of the threaded shaft 138 to bear against the receiving nut 134 and thereby more securely affix the roller assembly 110 to the stand assembly 120.

As mentioned above, the stand assembly supports a threaded shaft 138. The threaded shaft extends through an inner extrusion 144, itself telescopingly extending through an outer extrusion 146. Affixed to an outer wall of the outer extrusion 146 is the cruciate hinge assembly 158. The cruciate hinge assembly 158 hold each of four legs 156 by means of hinge pins 160 passing through the upper ends of the legs 156. The legs 156 bear against the outer extrusion 146 to limit their rotational movement about the hinge pins 160. In the expanded position wherein the lower ends of the legs 156 are moved away from the inner extrusion 144, the legs present a base to the ground. The lower end of each leg preferably includes a foot 162 for receiving a threaded leveling shaft 164 affixed to a glide 166. Alternately, but not illustrated, a spike for the glide is provided, allowing stable placement of the stand assembly 100 to a softer surface capable of receiving the spike.

The threaded shaft 138 extending through the inner extrusion 144 extends below the lower end of the inner extrusion 144. A spring retaining nut 180 is threaded on the threaded shaft 138 and held from rotation by a cotter pin 178. Coiled around the threaded shaft 138 between an upper spring washer 172 and a lower spring washer 176, each encircling the threaded shaft 138, is a coiled tensioning spring 174. The tensioning spring 174 bears against each of the upper spring washer 172 and a lower spring washer 176 in order to bias the shaft downwardly within the inner extrusion 144 pulling on the adjusting wing nut 140 resting on a bearing washer 142 against the upper end of the inner extrusion 144.

Figure 2:
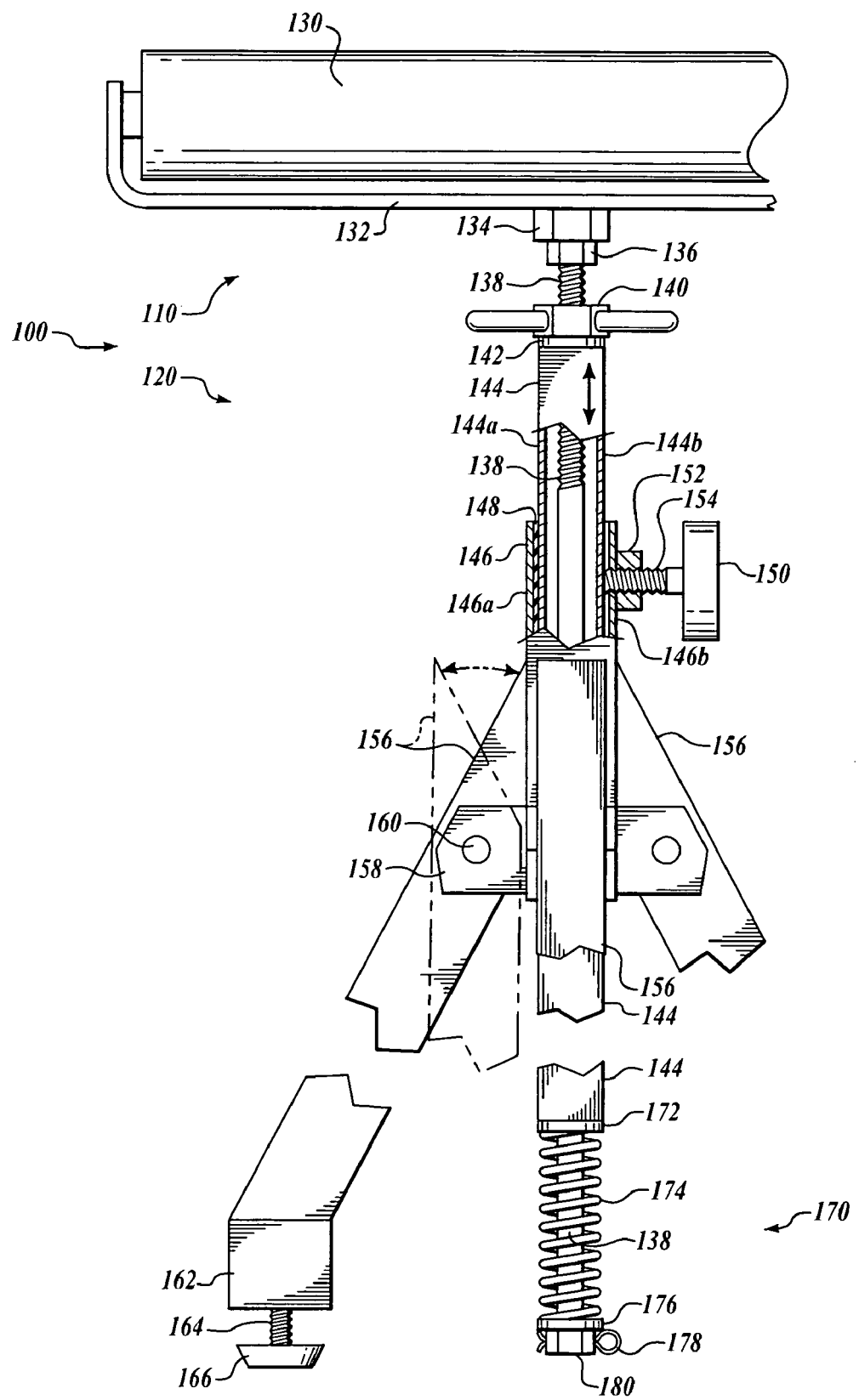
FIG. 2 is a cross-section view of the adjusting mechanism of the stand assembly.

FIG. 2 portrays the adjusting mechanism for the stand assembly 100 at the juncture between the roller assembly 110 and the base assembly 120. The roller assembly includes the roller 130 and the roller bracket 132 along with its receiving nut 134 affixed to the threaded shaft 138 with the jamming nut 136 suitably tightened against the receiving nut 134. The stand assembly is shown in partial cross section with the legs 156 bearing against the outer extrusion 146 and rotatable about the cruciate hinge assembly 158 around the hinge pins 160. The legs are in their "open" position with a lower surface of the feet 162 receiving the threaded leveling shaft 164 above the glides 166 resting on the surface. The threaded shaft 138 is movable within the inner extrusion 144 from a highest position where the spring 174 is completely compressed to a lowest position where the jamming nut 136 bears against the wing nut 140. Coarse adjustment is maintained by a detaining nub 150 affixed to a detaining threaded shaft 154 in turn rotatably received by a cashed nut 152. The cashed nut 152 is fixedly attached to a retaining outer extrusion wall 146b. Rotating the detaining nub 150 and consequently detaining threaded shaft 154 within the cashed nut 152 extends the detaining threaded shaft against the surface of the tensioning inner extrusion wall 144b pressing the inner extrusion 144 such that the opposing inner extrusion wall 144a is pressed against an opposing outer extrusion wall 146a. Thus a friction engagement fixedly maintains the relationship between the inner extrusion 144 and the outer extrusion 146. A series of friction pads 148 are interposed between the opposing inner extrusion wall 144a and the opposing outer extrusion wall 146a to enhance the friction fit.

Figure 3:
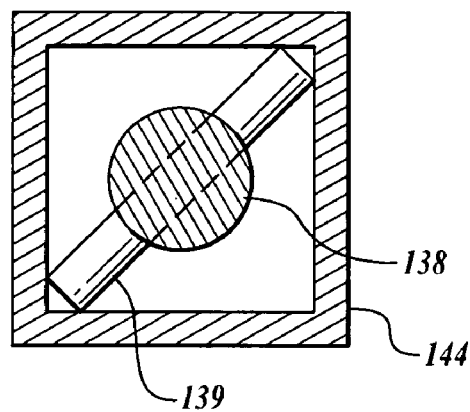
FIG. 3 is a cut-away drawing of the fine adjusting mechanism.

Once coarse adjustment is obtained, the relationship between the threaded shaft 138 and the inner extrusion 144 is maintained or adjusted by rotating the wing nut 140 as it bears against the bearing washer 142. The threaded shaft 138 is held in fixed rotational orientation with the inner extrusion 144 by means of an orienting pin 139 (FIG. 3). Therefore, rotating the wing nut 140 about the threaded shaft 138 causes the wing nut 140 to move axially along the threaded shaft 138 thereby raising or lowering the roller assembly 110 in relationship to the inner extrusion 144 and thereby moving it in relationship to the base assembly 120.

FIG. 3 shows the inner extrusion 144, the threaded shaft in cross section 138 and the orienting pin 139. Advantageously, the orienting pin provides an inexpensive means of fixing the rotation of the threaded shaft 138 with relationship to the inner extrusion 144 while the orienting pin 139 is free to slide axially up and down the inner extrusion 144.

Figure 4:
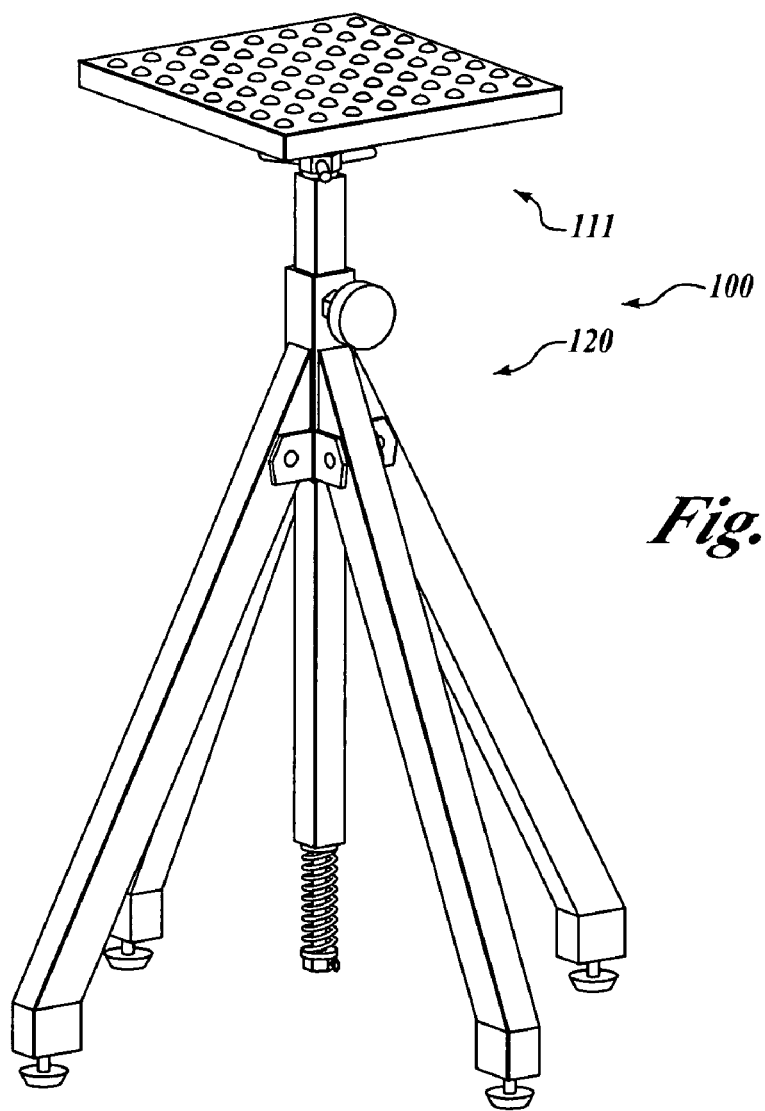
FIG. 4 is a perspective of the stand assembly with a bearing table in place.

FIG. 4 shows the stand assembly 100 where the base assembly 120 is used to support a bearing table 111 rather then the roller assembly (not pictured). Exchanging the roller assembly (not pictured) for the bearing table 111 is readily accomplished by loosening the jamming nut 136 (FIG. 1) and disengaging the threads of the threaded shaft 138 (FIG. 1) from the receiving nut 134 (FIG. 1).

While the preferred embodiment of the invention has being illustrated and described, as noted above, many changes can be made without departing from the spirit and scope of the invention. For example, movable glides with incorporated spikes may be substituted for the glides pictured so as to give purchase on a variety of surfaces. Accordingly, the scope of the invention is not limited by the disclosure of the preferred embodiment.

The invention claimed is:

1. An adjustable stand comprising:
a first tubular member having a rectangular cross-section and a first member upper end and a first member lower end, the first member upper end having at least three pivot pins, each pivot pin engaging in rotational engagement a leg, the legs together being configured to provide a stable base to the adjustable stand;

a second tubular member having a rectangular cross-section and configured to nest telescopically within the first tubular member and being adjustably secured to the first tubular member, the second tubular member having an interior wall defining a void and having an axis, a second member upper end, and a second member lower end, the second member upper end extending above the first member upper end in nested arrangement;

a threaded shaft having a shaft axis and situated within the void and such that the shaft axis extends along the axis;

a fine adjustment mechanism comprising a nut in threaded engagement with the threaded shaft, the nut configured to bear against the second member upper end;

an orienting pin passing through the shaft intersecting the shaft axis perpendicular thereto and configured to bear against the interior wall in a manner to prevent rotation of the shaft within the void.

2. The adjustable stand of claim 1, wherein the shaft further includes a biasing member arranged in opposed relation to the nut relative to the second tubular member, and configured to urge the nut into bearing arrangement against the second member upper end.

3. The adjustable stand of claim 1, further including a coarse adjustment mechanism coupled between the first and second tubular members, the coarse adjustment mechanism configured to selectively lock the position of the first tubular member relative to the second tubular member.

4. The adjustable stand of claim 3, wherein the coarse adjustment mechanism includes a screw rotatably secured to the first member, the screw having an end selectively bearing against the second tubular member.

5. The adjustable stand of claim 4, wherein the coarse adjustment mechanism further includes a friction pad between the first and second tubular members opposite the screw.

6. The adjustable stand of claim 1, wherein the first tubular member and the second tubular member have square cross-sections.

7. The adjustable stand of claim 6, wherein the shaft has a supporting member and a biasing member, and the supporting member is in opposed relation to the biasing member relative to the nut.

8. The adjustable stand of claim 7, wherein the supporting member is a tray.

9. The adjustable stand of claim 7, wherein the supporting member is an outfeed roller assembly.

10. The adjustable stand of claim 7, wherein the supporting member is a bearing table, the first tubular member is non-circular in cross section and wherein the lock comprises a pin extending transversely through the shaft.

11. The adjustable stand of claim 1, wherein the nut is a wingnut.

12. The adjustable stand of claim 11, wherein the wingnut includes a plurality of wings.

* * * * *